April 13, 1943.    J. MARSHALL    2,316,445
PRESSURE REGULATOR
Filed June 27, 1941
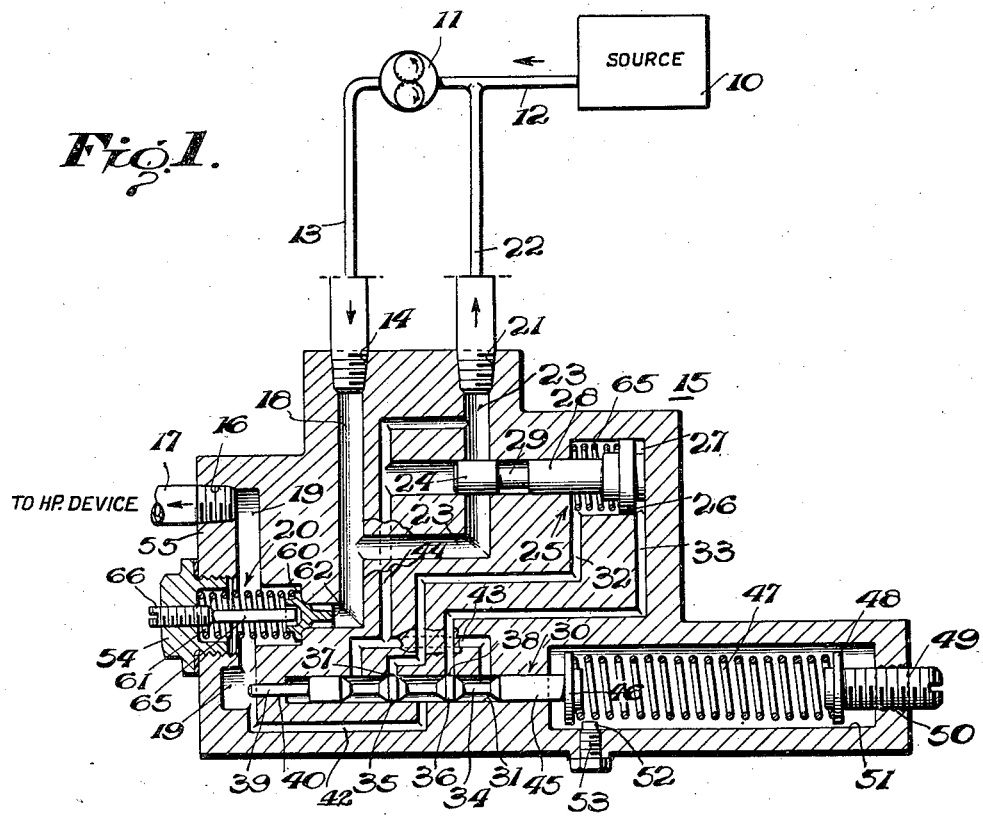
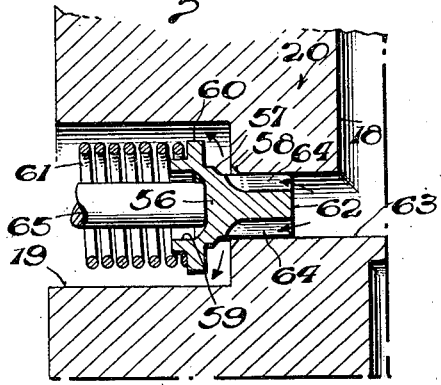
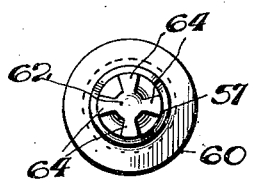
INVENTOR
John Marshall.
BY David F. Woody
ATTORNEY Patented Apr. 13, 1943

2,316,445

UNITED STATES PATENT OFFICE 2,316,445

PRESSURE REGULATOR

John Marshall, South Bend, Ind., assignor to Bendix Aviation Corporation, South Bend, Ind., a corporation of Delaware Application June 27, 1941, Serial No. 400,114

1 Claim. (Cl. 137—153)

This invention relates to pressure regulating systems, and more particularly to a regulator wherein the pressure variations may be automatically controlled.

In pressure regulating systems for aircraft, particularly those wherein hydraulic fluid from a high pressure source is used to actuate many auxiliaries, such as landing gear, wing flaps, de-icers, automatic pilots and many other servo-devices, it is customary to provide an accumulator wherein fluid may be stored at the desired working pressure during intervals in which the hydraulic system may be at rest, so that when a demand for fluid is made for the actuation of the landing gear, for example, an adequate supply is available without delay. Hydraulic systems employing accumulators have many drawbacks, principally of which are their weight and the requirement of space for fluid storage, which space might be utilized for other aircraft accessories.

It is an object of the present invention to provide a pressure regulator for a hydraulic servo-system, wherein automatic means is supplied for returning fluid under pressure to the input of the pressure source during intervals of non-use of the servo equipment.

Another object of the invention is the provision of a regulator wherein a servo-motor is employed for establishing the desired flow of fluid under varying conditions of the high pressure utilizing system.

A further object of the invention is the provision of a pressure regulating system wherein adequate pressure is maintained during periods of inactivity of auxiliary equipment, with a minimum of lost work.

Other objects will appear from a study of the following specification when made in conjunction with the attached drawing, throughout which like numerals designate like parts.

Fig. 1 is a sectional view of one embodiment of a pressure regulator made in accordance with the present invention, with the different fluid conduits and channels shown schematically.

Fig. 2 is a detail showing of a check valve included in Fig. 1; and

Fig. 3 is an end elevational view of the valve detail shown in Fig. 2.

High pressure hydraulic systems are commonly employed for operating the many different auxiliary devices required for take-off, landing and maintenance of flight of present day aircraft. It is characteristic of most of the auxiliary devices, such as landing gear, that the hydraulic motor for operating the device is in use for comparatively short intervals of time during a flight, and at rest for the major portion of the flight. It is required, however, that the pressure of the hydraulic system be always maintained at the proper level, and in the prior art hydraulic systems accumulators have been designed to store sufficient fluid at the desired pressure so that the system will be always ready to operate at an instant's notice. By means of the present invention, pressure in the system is maintained at all times, but the working interval of the high pressure pump that supplies the system with fluid is minimized, and when none of the auxiliaries are being actuated, the output of the pump is returned directly to the input, so that the work being done by the pump during this interval may be very light, thereby avoiding the generation of excessive and continuous heat, and obviating the necessity of a cooling system for dissipating heat.

Having particular reference to Fig. 1, 10 is an oil reservoir or sump, to which is connected the input of a high pressure pump 11 through a supply line 12. The output of pump 11 is connected through a conduit 13 to the input port 14 of a pressure regulator 15. Regulator 15 has an output port 16, to which may be connected any hydraulic motor (not shown) through a conduit 17. Within regulator 15 there is an input passageway or conduit 18 connected to an output passageway or conduit 19, by way of a check valve assembly 20. There is also provided a fluid return port 21, which is connected by means of a pipe 22 to the input of pump 11. Within regulator 15, there is an oil return passageway or conduit 23, which is in communication with input passageway 18 through a cut-off valve 24.

A servo-motor 25, which includes a piston 26 slidable in a cylinder 27, and a piston rod 28 connected to valve 24 through a rod member 29, is controlled by means of a control or servo-valve assembly 30 carried in a valve chamber 31, and which regulates the flow and the direction of flow of fluid under high pressure from output conduit 19 to cylinder 27, through either of the channels 32 and 33. Valve assembly 30 includes a valve rod member 34, carrying spaced valves 35 and 36, which, as shown in the drawing, cover ports 37 and 38 of channels 32 and 33, respectively. Rod 34 also carries a pin or piston member 39, which is slidable in a fluid-tight cylindrical bore 40, in valve chamber 31. A channel 42 places valve chamber 31 in communication with fluid at the pressure in output conduit 19, and by means of interconnecting channels 43 and 44, portions of valve chamber 31 are in communication with fluid return conduit 23.

Valve rod 34 terminates at its right end in an enlarged cylindrical shank 45, which carries an annular flange 46 seating one end of a helical spring 47. The other end of spring 47 engages with an annular flange 48, formed at one end of an adjusting screw 49, carried by the wall 50 of spring chamber 51. Compression of spring 47 and movement of shank 45 to the right are limited by a transversely extending pin member 52, which is maintained within chamber 51 by a screw-threaded portion 53, so that it engages with flange 46 to limit movement of shank 45 to the right.

A coiled spring member 67 is shown within cylinder 27, and its function is to urge piston 26 to the right in the absence of opposing fluid pressure, thus maintaining cut-off valve 24 in its closed position, so that under starting conditions, when the system is at substantially zero pressure throughout, pressure may be built up in output conduit 19, and also in the event of breakage of coiled spring 47, or of the failure of any other part of the servo-motor 25 and control valve assembly 30, the system may be run at high pressure; thus, operation of the different hydraulic servo-devices may be continued in spite of the absence of exact pressure regulation.

Having particular reference to Figs. 1 and 2, it will be seen that check valve assembly 20 includes a screw-threaded head member 54, in engagement with the end wall 55 of the housing of regulator 15, and a valve member 56 having an annular bevelled face portion 57, engageable with an annular bevelled seat portion 58, formed in the housing of regulator 15. Valve 56 also has a hollow cup-shaped portion 59, about which is an annular flange 60, carrying one end of a helical spring 61, the other end of which is seated in a hollow portion of head member 54. Valve 56 has an elongated guide portion 62, which is fitted to slide within the cylindrical throat 63 formed horizontally at the bottom end of input conduit 18. Guide portion 62 is of generally cylindrical form, with, however, certain portions cut away, as shown particularly in Figs. 2 and 3, leaving four salient wing portions 64, which are engageable with throat 63, and the cut away portions between arms 64 form passageways, through which fluid under pressure may pass, when valve 56 is in its open position, as indicated by the arrows in Fig. 2.

It is apparent that check valve 56 is designed to permit flow of fluid in only one direction, namely, from input conduit 18 to output conduit 19, and that the opening of valve 56 is limited by a pin member 65, which has a screw-threaded head portion 66, for external adjustment to control the amount of opening of valve member 56.

We may assume that the pressure level desired in output conduit 19 for satisfactory operation of the different hydraulic servo-devices attached to conduit 17 is three thousand pounds per square inch. The control valve assembly 30 is shown in its balanced condition, that is, the pressure in conduit 19 against pin 39 is balanced by the spring 47, and check valve 56 is closed. Under these conditions, the pressure in output conduit 19 is three thousand pounds per square inch.

The operation of the pressure regulator will now be described:

When the pressure regulator is first put into action with no high pressure in output conduit 18, then valve assembly 30 will have moved to its extreme left-hand position, since the low pressure in output conduit 19 has not sufficient balancing force to maintain valve assembly 30 in its balanced condition against the force of coiled spring 47. Also, valve 24 will be in its cut-off position, as shown, since there will be no pressure in channels 32 and 33 to either aid or oppose the force exerted by spring 67 in urging piston 26 to its extreme right-hand position in cylinder 27. When high pressure pump 11 begins to operate, fluid in conduit 18 will force check valve 56 to its open position, and pressure will be built up in output conduit 19. Since valve assembly 30 is in its left-hand position, the fluid under pressure in output conduit 19 will flow through channel 42, in through valve chamber 31 and through channel 32 to the left-hand side of piston 26 in cylinder 27, and thus, aid spring 27 in keeping valve 24 closed. When pressure in conduit 19 increases to the selected value, for example, three thousand pounds per square inch, pin 39 will be forced to the right against the action of spring 47, and will cause valves 35 and 36 to move to their neutral positions, as shown in the drawing. In this condition, fluid can flow through either of channels 32 or 33, and when pressure in output conduit 19 increases beyond three thousand pounds per square inch, pin 39 will be urged further to the right, and will open communication between fluid under pressure in channel 42 and channel 33, allowing fluid to pass through channel 33 into cylinder 27, and force piston 26 to the left, which results in opening cut-off valve 24. When valve 24 is opened, a low pressure path for fluid exists between input conduit 18 and fluid return conduit 23. When this low pressure path is established, check valve 56 is immediately snapped shut by the pressure in conduit 19, and by the tension of spring 61, so that pressure at three thousand pounds per square inch is maintained in output conduit 19. The fluid under pressure that is returned to the input of pump 11 through conduits 23 and 22 will be again pumped to the output and recirculated through the conduits 18 and 23. Since the input pressure is substantially the same as the output pressure, the work being done by pump 11 is at a minimum, and in reality, the pump carries a load of practically zero, since the only loss in pressure is due to the friction of conduits 13, 18, 23 and 22.

When, upon demand of a servo-device, the pressure begins to fall in conduit 19, spring 47 will force valve assembly 30 to the left, since the balancing force of pressure in conduit 19 against pin 39 is insufficient to maintain the balanced condition shown in the drawing. This movement of valve assembly 30 allows fluid under pressure to flow through channel 42 into channel 32 to force piston 26 to its right-hand position, and again close cut-off valve 24. The fluid at the right-hand side of piston 26 will be displaced, since communication between channels 33 and 43 is established through chamber 31 with the valve assembly in its left-hand position, and the displaced fluid may then flow through channel 44 back to the input of pump 11 through conduits 23 and 22. Upon the closing of valve 24 in this manner, fluid under pressure in conduit 18 will again force check valve 56 to its open position until the three thousand pounds per square inch value of pressure is established in conduit 19.

It should be noted that three coiled springs are used in the embodiment of the invention shown. Springs 27 and 61 need have no critical value of tension, since their principal function is merely to maintain valves 24 and 56, respectively, in their closed positions in the absence of substantial fluid pressure operating against the valves. Thus, any change in the tensional value of these springs that may occur in normal operation does not affect the sensitivity of the regulation possible by the novel system described. Spring 47 is selected so as to have a critical operating value, but it should be noted that the compression and expansion permitted in the spring shown is only a small portion of the expansion and compression possible due to the construction of the spring. Thus, at no time will spring 47 be forced to expand or contract in the neighborhood of its elastic limit, and it will therefore maintain a constant tensional value over a long period of use. The use of the servo or control valve assembly 30 for controlling the operation of cut-off valve 24 permits the restriction of movement of coiled spring 47 to a narrow range, since the amount of movement of valve assembly 30 necessary to control the operation of valve 24 is very small.

The novel pressure regulator shown permits close and accurate regulation of pressure in a hydraulic system, and therefore, obviates the disadvantages of regulators of the prior art wherein metered spring members, which are used to directly control the opening and closing of regulator valves, are subjected to wide ranges of expansion and contraction, which tend to shorten the useful life of the springs, and to change the regulation of the hydraulic system.

While only one embodiment of the present invention has been shown in the drawing, it is to be understood that various changes may be made without departing from the scope of the present invention. For this reason, it is intended not to limit the invention by the description herein given as an example, but solely by the scope of the appended claim.

I claim:

A pressure regulator comprising an inlet conduit for fluid under pressure, an outlet conduit for such fluid, a check valve located therebetween, a fluid return conduit in circuit with said inlet conduit, a cut-off valve between said fluid inlet conduit and said fluid return conduit, a servo-valve for controlling the operation of said cut-off valve, a pin connected to one end of said servo-valve, a spring in compression against the other end of said servo-valve, said pin projecting with a sliding sealed fit, into said outlet conduit and movable against compression of said spring to operate said servo-valve when the pressure against said pin in said outlet conduit exceeds a fixed value, a cylinder having a fluid conduit opening into each end thereof, said fluid conduits being connected, through said servo-valve to said outlet conduit, a piston within said cylinder connected to said cut-off valve, so that upon movement of said servo-valve due to excessive pressure upon said pin communication between said cylinder and said outlet pressure conduit is established to move said piston and carry said cut-off valve to its open position, thereby placing said inlet pressure and said fluid return conduits in direct communication.

JOHN MARSHALL.